E. H. WAUGH.
BUSHING.
APPLICATION FILED JULY 22, 1912.
1,229,837.
Patented June 12, 1917.
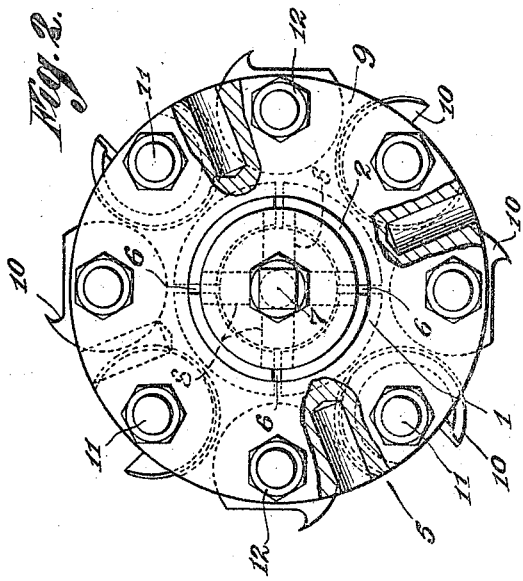
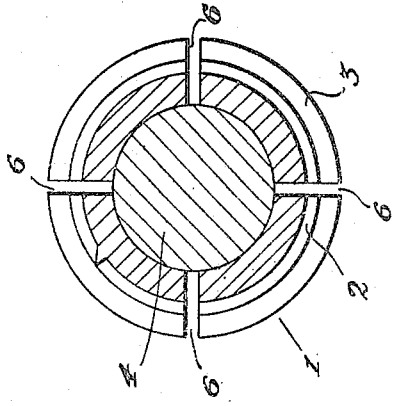
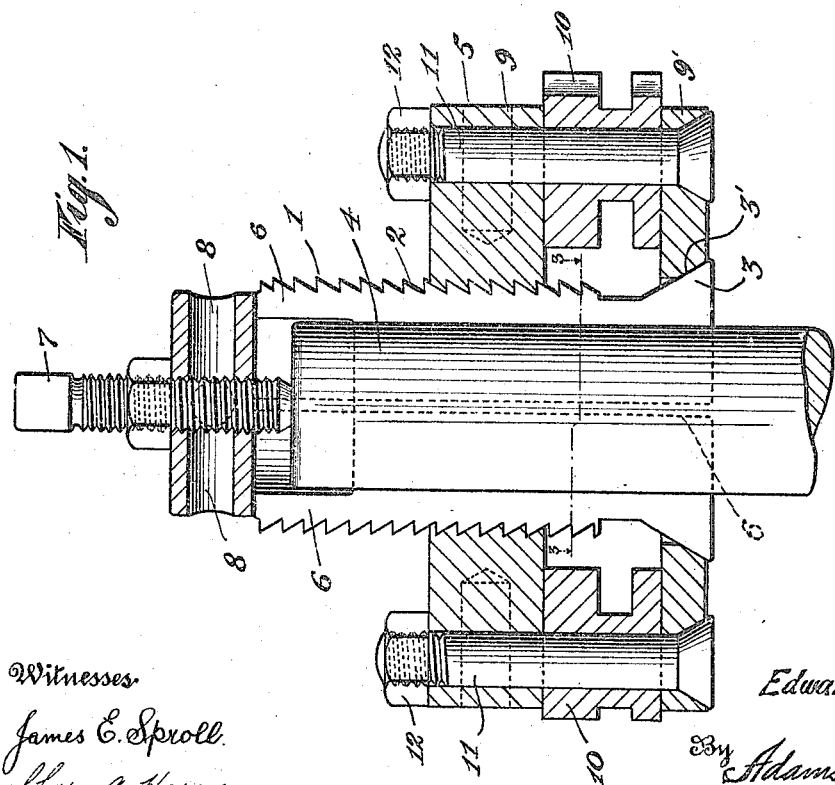
Witnesses
James E. Sproll.
Clara A. Harm.
Inventor
Edward H. Waugh.
By Adams & Brooks
Attorneys.

UNITED STATES PATENT OFFICE.

EDWARD H. WAUGH, OF SEATTLE, WASHINGTON, ASSIGNOR TO JOHN W. WINNINGHAM, OF SEATTLE, WASHINGTON.

BUSHING.

1,229,837. Specification of Letters Patent. Patented June 12, 1917.

Application filed July 22, 1912. Serial No. 710,942.

*To all whom it may concern:*

Be it known that I, EDWARD H. WAUGH, a citizen of the United States of America, and a resident of the city of Seattle, in the county of King and State of Washington, have invented certain new and useful Improvements in Bushings, of which the following is a specification.

My invention has for its primary object to provide a device of the above type through the medium of which rotatable driving and driven elements are connected in an efficient manner for movement of one with the other.

The invention resides in the features of construction, arrangements and combinations of parts hereinafter described and succinctly defined in my annexed claims.

Referring to the accompanying drawing wherein like numerals of reference indicate like parts throughout:

Figure 1 is a section illustrating a cutter head equipped with my improved bushing.

Fig. 2 is a plan thereof, and

Fig. 3 is a horizontal section on line 3—3 of Fig. 1.

My bushing comprises a hollow sleeve 1, adapted to engage in the bore of the cutter head, or pulley or other power transmitting element, as 5, and to receive a shaft or spindle, as 4.

Sleeve 1 for its major portion is cylindrical in form and provided with external screw threads 2, these preferably extending in a direction opposite to the direction of rotation of element 5, to thereby prevent accidental loosening of said element, and being of the ratchet type and engaging similar threads in the bore of element 5 to thereby obtain abrupt spirally-extending meeting faces or shoulders opposing endwise thrust incident to element 5 being forced against an external shoulder 3 of the sleeve.

Shoulder 3 is provided at the free or inner end portion of the bushing and tapers toward the external screw threaded portion 2. Bushing 1 is further split longitudinally, as at 6, the slits extending lengthwise of the bushing and through threaded portion 2 thereof so that as the element 5 is screwed down onto the shoulder or tapered portion 3, the respective longitudinal sections of the bushing will be sprung inwardly into tight clamping relation with shaft 4, which action brings the engaging teeth 2 into slight angular relation with respect to the teeth of element 5 and thereby firmly locks element 5 on the bushing.

One end portion of the bore of element 5 is slightly tapered, as at 3', for reception of shoulder 3, as is apparent.

Reference numeral 7 indicates an adjusting screw, threaded in the outer end portion of bushing 1 and opposing the adjacent end surface of spindle 4, and 8 indicates sockets in said bushing adapted for reception of a suitable instrument for holding the bushing against rotation during seating of element 5.

I have shown element 5 as comprising a cutter head, embodying spaced supports 9, 9' between which suitable cutters 10 are fitted, the said cutters serving as sustaining spacers for said supports the former of which is provided with screw threads for engagement with the threads 2, and the latter provided with the tapered opening 3'. Clamping bolts 11 pass through supports 9, 9' and the cutters 10, these bolts preferably having their heads countersunk in support 9' and having their threaded end portions projecting through support 9 and provided with nuts 12. By thus forming the cutter head of separate supports, and providing one thereof with the tapered opening 3', tapered bushing portion 3 acts conjointly with bolts 11 to draw and hold support 9' to a desired relation with respect to support 9, for clamping the cutters.

Having thus described my invention what I claim as new, and desire to secure by Letters Patent of the United States of America, is:—

1. The combination with a shaft member, of a member to be secured thereto against relative rotation, a sleeve interposed between the members and having a portion that tapers from one end inwardly, and a smaller exteriorly threaded portion screwed into the second member, said sleeve having slits from one end through the threaded portion and terminating short of the other end, the smaller threaded portion projecting beyond the member in which it is placed and having means whereby it can be turned.

2. The combination with a shaft member, of a member to be secured thereto against relative rotation, a sleeve interposed between the members and having an enlarged tapered portion and a smaller exteriorly threaded portion screwed into the second member, said sleeve having slits from one end through the threaded portion and terminating short of the other end, said other end being closed and projecting beyond the member in which it is placed, and a screw threaded through said closed end and bearing against the end of the shaft member.

3. The combination with a shaft member, of a member to be secured thereto and comprising spaced elements, one of which has a tapered bore, another of said spaced elements having internal screw threads, means connecting the elements to hold them against relative rotation, a sleeve interposed between the members, said sleeve having a tapered portion engaged in the tapered bore of one element and having an externally threaded portion screwed into the bore of the said other element, said sleeve furthermore being longitudinally split, said sleeve also constituting supplemental means for drawing the elements toward each other.

4. The combination with a shaft member, of a split sleeve thereon having ratchet threads and a tapered portion, and a member surrounding the sleeve and mounted directly thereon, said member comprising spaced elements, means connecting the elements for drawing them toward each other, one of said elements being located on the tapered portion of the sleeve, another of said elements having a threaded engagement with said sleeve, and said sleeve constituting supplemental means for securing the spaced elements together.

5. The combination with a shaft member and a member to be secured thereon, of a sleeve having a non-tapered clamping section interposed between said members and slit lengthwise, said clamping section of the sleeve and one of the members having threaded engagement, said member and a part of the sleeve having other surfaces engaging to resist axial movement.

6. The combination with a shaft member and a member to be secured thereon of a sleeve having a longitudinally slitted clamping section adapted to be interposed between the said two members, said interposed section of the sleeve and one of the said members having engaging threads and other surfaces engaging to resist relative axial movements.

7. The combination with a shaft member and a member to be secured thereon, of a sleeve, said sleeve having a longitudinally slitted clamping section adapted to be interposed between said members, said sleeve and one of the members having surfaces engaging to resist relative axial movements, said member and the slitted clamping section of the sleeve having engaging threads in which one flank has an abrupt face and the other flank is gently sloping, said latter flank being positioned to resist relative axial movement in opposition to said other mentioned engaging surfaces of the like parts.

8. The combination with a shaft member and a member to be secured thereon, of a sleeve adapted to be interposed between said members, an interposed section of the sleeve and the opposed surfaces of the shaft and of the member to be secured thereto, being non-tapered, said interposed section of the sleeve being longitudinally slit, one end of the sleeve and one of the other members having surfaces engaging to resist relative axial movement, the last mentioned member and the slitted portion of the sleeve having threaded engagement, the flanks of the threads being of unequal angular inclination with the lower angled flank placed to produce an axial thrust between said other mentioned thrust surfaces.

9. In a cutter head, in combination, a shaft, two axially separated frame members, cutter elements placed between said frame members outwardly of the shaft, and a clamping sleeve interposed between the shaft and said frame members, one end of said sleeve having axial thrust bearing upon one of the frame members, and threaded engagement with the other frame member, the part of the sleeve which engages with said latter frame member being longitudinally slit.

10. In a cutter head, in combination, a shaft, two axially separated frame members, cutter elements placed between said frame members outwardly of the shaft, means for holding said cutting elements in position, and a clamping sleeve interposed between the shaft and said frame members, one end of said sleeve having axial thrust bearing upon one of the frame members, and threaded engagement with the other frame member, the part of the sleeve which engages with said latter frame member being longitudinally slit.

11. The combination with a shaft, and a member to be secured thereon, of a clamping sleeve adapted to be interposed between said member and the shaft, said sleeve and said member having conical rotatively engaging surfaces at one side of the member, the sleeve having a longitudinally slitted section having threaded engagement with said member extending inward from the other side of said member.

Signed at Seattle, Washington, this 2nd day of July, 1912.

EDWARD H. WAUGH.

Witnesses:
H. D. BUCHANAN,
ARLITA ADAMS.